US012671934B2

(12) United States Patent
Yang

(10) Patent No.: US 12,671,934 B2
(45) Date of Patent: Jun. 30, 2026

(54) EARPHONE WITH BINAURAL BEATS FUNCTION

(71) Applicant: Bill Yang, Taipei City (TW)

(72) Inventor: Bill Yang, Taipei City (TW)

(73) Assignee: Contron Corporation, Taipei City (TW)

( * ) Notice: Subject to any disclaimer, the term of this patent is extended or adjusted under 35 U.S.C. 154(b) by 125 days.

(21) Appl. No.: 18/764,183

(22) Filed: Jul. 4, 2024

(65) Prior Publication Data

US 2025/0324191 A1 Oct. 16, 2025

(30) Foreign Application Priority Data

Apr. 10, 2024 (TW) ................................ 113113242
May 31, 2024 (TW) ................................ 113120346

(51) Int. Cl.

*H04R 1/24* (2006.01)
*H04R 1/10* (2026.01)
*H04R 9/06* (2006.01)

(52) U.S. Cl.

CPC ............. *H04R 1/24* (2013.01); *H04R 1/1033* (2013.01); *H04R 1/1041* (2013.01); *H04R 9/06* (2013.01);

(Continued)

(58) Field of Classification Search

CPC ...... H04R 1/24; H04R 1/1033; H04R 1/1041; H04R 9/06; H04R 2460/13

(Continued)

(56) References Cited

U.S. PATENT DOCUMENTS 5,518,497 A 5/1996 Widjaja et al.
9,480,812 B1 11/2016 Thompson (Continued)

FOREIGN PATENT DOCUMENTS

CN 2822671 10/2006
CN 103796702 5/2014

(Continued)

OTHER PUBLICATIONS

"Office Action of UK Counterpart Application", issued on Mar. 28, 2025, p. 1-p. 7.

(Continued)

*Primary Examiner* — Vivian C Chin
*Assistant Examiner* — Douglas J Suthers
(74) *Attorney, Agent, or Firm* — JCIPRNET

(57) ABSTRACT

An earphone with binaural beats function includes a left ear speaker configured to provide a first sound wave to a left ear of a user, a right ear speaker configured to provide a second sound wave to a right ear of the user, a wireless communicator, and a frequency adjuster signally connected to the left and right ear speakers via a wire, and signally connected to the wireless communicator. The frequency adjuster receives an external audio signal from the wireless communicator, and adjusts the external audio signal to a first audio signal and a second audio signal to then transmit to the left and right ear speakers respectively, so that the left and right ear speakers emit the first sound wave and the second sound wave respectively. A first frequency of the first sound wave and a second frequency of the second sound wave have a frequency difference.

10 Claims, 4 Drawing Sheets

(52) U.S. Cl.
CPC ...... *H04R 2420/07* (2013.01); *H04R 2460/13* (2013.01)

(58) Field of Classification Search
USPC .......................................................... 381/311
See application file for complete search history.

(56) References Cited

U.S. PATENT DOCUMENTS

| | | | | |
|---|---|---|---|---|
| 2015/0071448 | A1 | 3/2015 | Mesfin | |
| 2016/0030702 | A1* | 2/2016 | Yang | A61M 21/02 600/28 |
| 2020/0068331 | A1* | 2/2020 | Robertson | H04S 3/02 |
| 2020/0382884 | A1 | 12/2020 | Chang et al. | |
| 2021/0345059 | A1 | 11/2021 | Choi et al. | |
| 2024/0004218 | A1 | 1/2024 | Yang | |

FOREIGN PATENT DOCUMENTS

| | | | |
|---|---|---|---|
| CN | 112087699 | | 12/2020 |
| CN | 112312276 | | 8/2021 |
| CN | 214627303 | | 11/2021 |
| CN | 111916115 | | 9/2022 |
| CN | 218006490 | | 12/2022 |
| CN | 218956956 | | 5/2023 |
| CN | 117331246 | | 1/2024 |
| DE | 102015201945 | | 8/2016 |
| EP | 4300990 | | 1/2024 |
| JP | H0833714 | | 2/1996 |
| JP | 2014507889 | | 3/2014 |
| JP | 2017111414 | | 6/2017 |
| JP | 3236581 | U | 3/2022 |
| JP | 3242115 | | 5/2023 |
| KR | 20080001573 | | 1/2008 |
| KR | 20080034678 | A | 4/2008 |
| KR | 20100127054 | | 12/2010 |
| KR | 101858927 | | 5/2018 |
| RU | 2740255 | | 1/2021 |
| TW | M286532 | | 1/2006 |
| TW | 200843542 | | 11/2008 |
| TW | 202322772 | | 6/2023 |
| WO | 2006101571 | | 9/2006 |
| WO | 2012103940 | | 8/2012 |
| WO | 2018159519 | A1 | 9/2018 |

OTHER PUBLICATIONS

"Office Action of Korean counterpart Application", issued on Sep. 18, 2025, p. 1-p. 7.

Anushka Gupta et al., "Significance of Alpha Brainwaves in Meditation examined from the study of Binaural Beats", 2016 International Conference on Signal Processing and Communication, Dec. 26, 2016, pp. 484-489.

Siddharth Sharma et al., "Survey on Binaural Beats and Background Music For Increased Focus and Relaxation", 2017 International Conference on Emerging Trends & Innovation in ICT, Feb. 3, 2017, pp. 98-103.

"Search Report of Europe Counterpart Application", issued on Jan. 16, 2025, p. 1-p. 9.

"Office Action of Russia Counterpart Application", issued on May 20, 2025, p. 1-p. 10.

"Office Action of Japan Counterpart Application", issued on May 20, 2025, p. 1-p. 6.

"Office Action of Australia Counterpart Application", issued on Jun. 30, 2025, p. 1-p. 6.

"Office Action of Taiwan Counterpart Application", issued on Jul. 17, 2025, p. 1-p. 10.

* cited by examiner

EARPHONE WITH BINAURAL BEATS FUNCTION

CROSS-REFERENCE TO RELATED APPLICATION

This application claims the priority benefit of Taiwan application serial no. 113113242, filed on Apr. 10, 2024, and Taiwan application serial no. 113120346, filed on May 31, 2024. The entirety of each of the above-mentioned patent applications is hereby incorporated by reference herein and made a part of this specification.

BACKGROUND

Technical Field

The disclosure relates to an earphone, and particularly relates to an earphone with binaural beats function.

Description of Related Art

With the current rapid advancement of technology, long-distance mobility has become a part of people's daily lives. In order to reduce the fatigue during long-distance mobility, people often use earphones to listen to music or enjoy audio and video content without disturbing others around them. However, how to improve the use experience of earphones is a part that the earphone industry is constantly improving on.

SUMMARY

The disclosure provides an earphone with binaural beats function that allows users to feel binaural beats.

An earphone with binaural beats function of the disclosure includes a left ear speaker, a right ear speaker, a wireless communicator, and a frequency adjuster. The left ear speaker is configured to provide a first sound wave to a left ear of a user. The right ear speaker is configured to provide a second sound wave to a right ear of the user. The frequency adjuster is signally connected to the left ear speaker and the right ear speaker via a wire, and is signally connected to the wireless communicator. The frequency adjuster receives an external audio signal from the wireless communicator. The frequency adjuster adjusts the external audio signal to a first audio signal and then transmits the first audio signal to the left ear speaker, so that the left ear speaker emits the first sound wave. The frequency adjuster adjusts the external audio signal to a second audio signal and then transmits the second audio signal to the right ear speaker, so that the right ear speaker emits the second sound wave. A first frequency of the first sound wave and a second frequency of the second sound wave have a frequency difference.

In an embodiment of the earphone with binaural beats function, the earphone with binaural beats function further includes an audio connection port and a switch. The frequency adjuster is signally connected to the audio connection port or the wireless communicator via the switch, and receives the external audio signal from the audio connection port or the wireless communicator.

In an embodiment of the earphone with binaural beats function, the earphone with binaural beats function further includes an audio cable. Two ends of the audio cable are inserted into the audio connection port and an audio output socket of an analog audio output device.

In an embodiment of the earphone with binaural beats function, the earphone with binaural beats function further includes a control box. The audio connection port, the wireless communicator, the switch, and the frequency adjuster are disposed in the control box.

In an embodiment of the earphone with binaural beats function, the switch is a manual switch.

In an embodiment of the earphone with binaural beats function, the earphone with binaural beats function further includes a wireless receiver configured to receive FM broadcasts or Bluetooth broadcasts, and signally connected to the left ear speaker and the right ear speaker via a wire.

In an embodiment of the earphone with binaural beats function, the wireless communicator performs wireless communication with a mobile phone, and the mobile phone transmits the external audio signal.

In an embodiment of the earphone with binaural beats function, the wireless communicator performs Bluetooth communication.

In an embodiment of the earphone with binaural beats function, the frequency adjuster includes an analog-to-digital conversion circuit, a frequency adjustment circuit, and a digital-to-analog conversion circuit that are signally connected in sequence.

In an embodiment of the earphone with binaural beats function, the frequency difference includes a plurality of switchable first frequency differences. The first frequency differences are in two or more ranges that are between 0.5 Hz and 4 Hz, between 4 Hz and 8 Hz, between 8 Hz and 12 Hz, between 12 Hz and 20 Hz, and between 25 Hz and 40 Hz.

In an embodiment of the earphone with binaural beats function, the frequency difference includes the plurality of switchable first frequency differences. The first frequency differences automatically change cyclically in two or more ranges that are between 0.5 Hz and 4 Hz, 4 Hz and 8 Hz, 8 Hz and 12 Hz, 12 Hz and 20 Hz, and 25 Hz and 40 Hz.

In an embodiment of the earphone with binaural beats function, the left ear speaker and the right ear speaker are moving coil type speakers, moving iron type speakers, or bone conduction type speakers.

Based on the above, in the earphone with binaural beats function of the disclosure, the sound waves received by the two ears have a frequency difference, which allows the user to produce corresponding effects other than hearing the sound waves.

DESCRIPTION OF THE EMBODIMENTS

Figure 1:
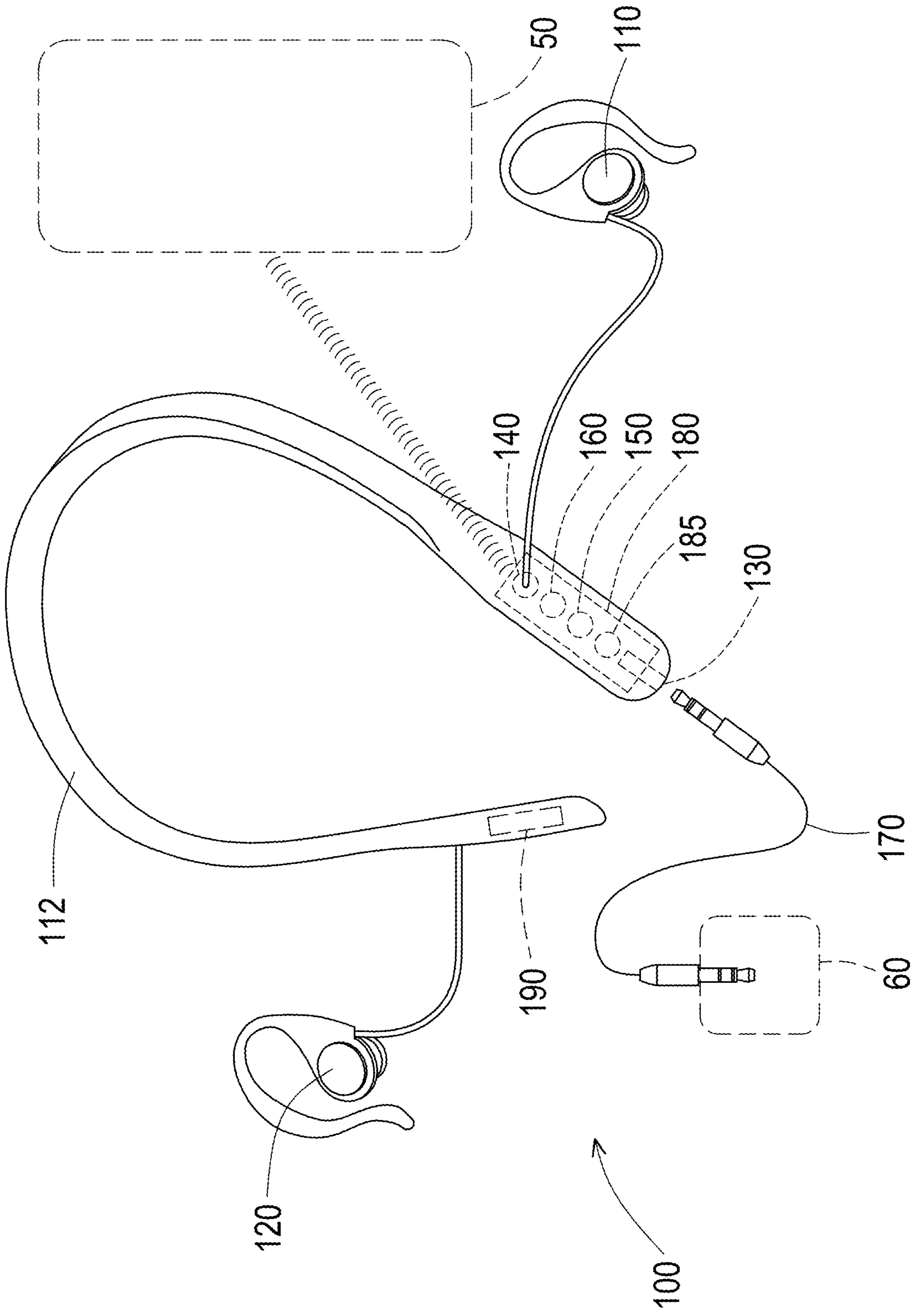
FIG. 1 is a schematic diagram of an earphone with binaural beats function according to an embodiment of the disclosure.
Figure 2:
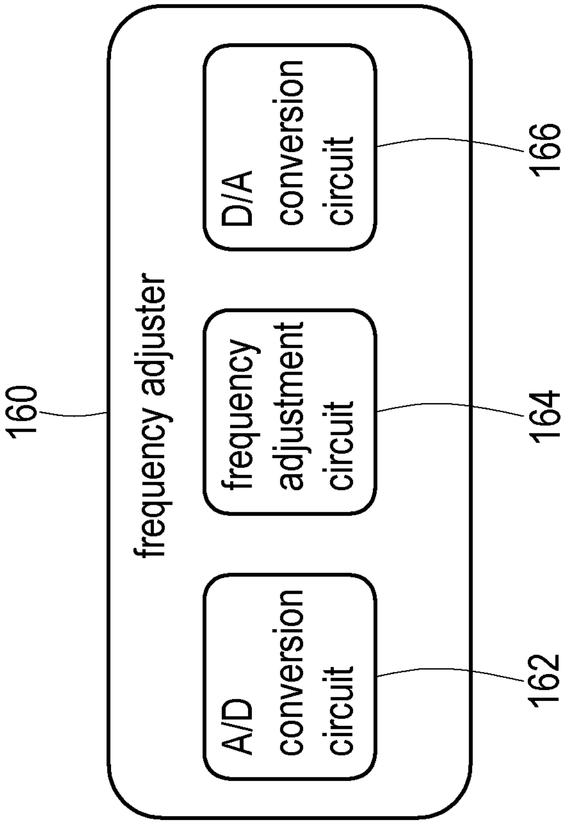
FIG. 2 is a schematic circuit block diagram of the earphone with binaural beats function of FIG. 1.

FIG. 1 is a schematic diagram of an earphone with binaural beats function according to an embodiment of the disclosure. FIG. 2 is a schematic circuit block diagram of the earphone with binaural beats function of FIG. 1. Referring to FIG. 1 and FIG. 2, an earphone with binaural beats function 100 of the embodiment includes a left ear speaker 110, a right ear speaker 120, a wireless communicator 140, and a frequency adjuster 160. The left ear speaker 110 is configured to provide a first sound wave to a left ear of a user. The right ear speaker 120 is configured to provide a second sound wave to a right ear of the user. The left ear speaker 110 and the right ear speaker 120 may be of bone conduction type, earhook type, earmuff type, in-ear type, or other forms.

The earphone with binaural beats function 100 is an integrated earphone. That is, the left ear speaker 110 and the right ear speaker 120 are fixedly connected together and cannot be separated. For example, the earphone with binaural beats function 100 has a moderately deformable arc-shaped shell 112, and the left ear speaker 110 and the right ear speaker 120 are respectively installed at two opposite ends of the shell 112. In addition to housing the left ear speaker 110 and the right ear speaker 120, the shell 112 also houses the wireless communicator 140 and the frequency adjuster 160. At the same time, the shell 112 also functions to hang the entire earphone with binaural beats function 100 on the user's neck. However, the left ear speaker 110, the right ear speaker 120, the wireless communicator 140, and the frequency adjuster 160 can also be connected via a wire without configuring the shell 112.

The frequency adjuster 160 is signally connected to the left ear speaker 110 and the right ear speaker 120 via a wire. That is to say, the signal connection between the frequency adjuster 160 and the left ear speaker 110 is in a wired manner, and the signal connection between the frequency adjuster 160 and the right ear speaker 120 is also in a wired manner. The circuit for connecting may also be housed within shell 112. Since the frequency adjuster 160 is signally connected to the left ear speaker 110 and the right ear speaker 120 via a wire, signals can be transmitted to the left ear speaker 110 and the right ear speaker 120 synchronously, and there is no need to consider whether the left ear speaker 110 and the right ear speaker 120 are synchronized, which is a problem when receiving signals during wireless transmission.

The frequency adjuster 160 receives an external audio signal from the wireless communicator 140. The frequency adjuster 160 adjusts the external audio signal to a first audio signal and then transmits the first audio signal to the left ear speaker 110, so that the left ear speaker 110 emits the first sound wave. The frequency adjuster 160 adjusts the external audio signal to a second audio signal and then transmits the second audio signal to the right ear speaker 120, so that the right ear speaker 120 emits the second sound wave. A first frequency of the first sound wave and a second frequency of the second sound wave have a frequency difference.

Brain waves refer to the electrical swings produced by the activity of nerve cells in the human brain, which can also be said to be the rhythm of brain cell activity. At any time, the human brain produces brain waves. Classified by frequency, brain waves include at least beta waves, alpha waves, theta waves, delta waves, and gamma waves. Generally speaking, when a person is in the third stage of non-rapid eye movement sleep, the brain waves are usually delta waves (frequency between 0.5 Hz and 4 Hz). When a person is in a state of deep sleep, dreaming, deep meditation, or intense subjective state, the brain waves are usually theta waves (frequency between 4 Hz and 8 Hz) When a person is in a state of confusion before going to sleep, gradually blurred consciousness, sudden inspiration, or relaxed body and mind and focused concentration, the brain waves are usually alpha waves. When a person is in a relaxed but focused state, sorting out previously received information, the brain waves are usually beta waves. However, research has also found that when the human brain is induced to produce different brain waves, it will in turn affect the person's state. For example, when the human brain is induced to produce alpha waves, the person concerned will also be brought into a state of sudden inspiration, relaxed body and mind, and focused concentration.

By setting the frequency difference between the first sound wave and the second sound wave provided by the earphone with binaural beats function 100, the user's brain can be induced to generate beta waves, alpha waves, theta waves, delta waves, gamma waves, or other brain waves, so that the user may enter the corresponding state mentioned above.

For example, the wireless communicator 140 of the embodiment can perform wireless communication with a mobile phone 50, and the mobile phone 50 transmits music, video audio, voice audio, or other external audio. The wireless communicator 140 performs Bluetooth communication or other wireless communication, for example. The frequency adjuster 160 can adjust the external audio signal received from the mobile phone 50 to allow the user's left ear and right ear to hear sound waves with frequency differences, so that the user's brain may stimulate the production of specific brain waves to achieve effects such as improving concentration, sleeping comfortably, relieving stress, and entering meditation.

In the embodiment, the frequency difference includes a plurality of switchable first frequency differences. That is, the user can control the frequency adjuster 160 according to current requirements, so that the frequency difference is set to a different first frequency difference. The first frequency differences are in two or more of the five ranges that are between 0.5 Hz and 4 Hz, between 4 Hz and 8 Hz, between 8 Hz and 12 Hz, between 12 Hz and 20 Hz, and between 25 Hz and 40 Hz. For example, there may be two first frequency differences. One of the first frequency differences is in one of the five ranges that are between 0.5 Hz and 4 Hz, between 4 Hz and 8 Hz, between 8 Hz and 12 Hz, between 12 Hz and 20 Hz, and between 25 Hz and 40 Hz. The other first frequency difference is in the other of the five ranges that are between 0.5 Hz and 4 Hz, between 4 Hz and 8 Hz, between 8 Hz and 12 Hz, between 12 Hz and 20 Hz, and between 25 Hz and 40 Hz. As another example, there may be three first frequency differences. One of the first frequency differences is in one of the five ranges that are between 0.5 Hz and 4 Hz, between 4 Hz and 8 Hz, between 8 Hz and 12 Hz, between 12 Hz and 20 Hz, and between 25 Hz and 40 Hz. Another first frequency difference is in another range of the five ranges that are between 0.5 Hz and 4 Hz, between 4 Hz and 8 Hz, between 8 Hz and 12 Hz, between 12 Hz and 20 Hz, and between 25 Hz and 40 Hz. The remaining first frequency difference is in one of the remaining three ranges after excluding the first two ranges from the five ranges that are between 0.5 Hz and 4 Hz, between 4 Hz and 8 Hz, between 8 Hz and 12 Hz, between 12 Hz and 20 Hz, and between 25 Hz and 40 Hz.

In the embodiment, the frequency difference can automatically change cyclically over time. In other words, each first frequency difference can automatically change cyclically in one of its own ranges among the above five ranges. That is, the frequency difference is not fixed. Moreover, the frequency difference will automatically change in a preset manner without human intervention. In addition, the way the frequency difference changes is preset and cannot be adjusted or selected by the user. Alternatively, there can be a plurality of variations, and the user can choose which variation to use. In addition, the user's physiological state is not detected before determining the changing pattern of the frequency difference, that is, the changing pattern of the frequency difference does not change according to the difference in the user's physiological state.

For example, the frequency difference can automatically and segmentally change cyclically between 8 Hz and 12 Hz. The frequency difference changes by 0.1 Hz each time, and the same frequency difference is maintained for 10 seconds after each change. An automatic and segmented cyclic change of the frequency difference between 8 Hz and 12 Hz means, for example, a gradual change from 8 Hz to 12 Hz, and then a gradual change from 12 Hz to 8 Hz, or a repeated gradual change from 8 Hz to 12 Hz, or a repeated gradual change from 12 Hz to 8 Hz.

In the embodiment, the frequency difference can automatically change cyclically between 0.5 Hz and 4 Hz to induce delta waves. The frequency difference can automatically change cyclically between 4 Hz and 8 Hz to induce theta waves. The frequency difference can automatically change cyclically between 8 Hz and 12 Hz to induce alpha waves. The frequency difference can automatically change cyclically between 12 Hz and 20 Hz to induce beta waves. The frequency difference can be automatically change cyclically between 25 Hz and 40 Hz to induce gamma waves. In addition, in the embodiment, if the time period is not long enough, the frequency difference may only gradually become larger or only gradually become smaller.

Each user's brain can not only produce better induction effects for a single frequency difference, but usually can produce better induction effects for a plurality of frequency differences. Since the neck-mounted earphone of the embodiment induces the user with frequency differences that automatically change cyclically, it can produce a better induction effect at a plurality of frequency differences. Although the subject has a better induction effect on the input single frequency difference, it may not last long. Since the neck-mounted earphone of the embodiment induces the user with frequency differences that automatically change cyclically and that automatically change cyclically in a selected range, after the user's brain is tired, another frequency difference can be changed to produce a better induction effect again. Finally, the neck-mounted earphone of the embodiment can produce better brainwave-inducing effects over a longer period of time.

In the embodiment, the earphone with binaural beats function 100 may further include an audio connection port 130 and a switch 150. The frequency adjuster 160 is signally connected to the audio connection port 130 or the wireless communicator 140 via the switch 150, and receives the aforementioned external audio signal from the audio connection port 130 or the wireless communicator 140. That is, the frequency adjuster 160 is not signally connected to the audio connection port 130 and the wireless communicator 140 at the same time. When the frequency adjuster 160 is signally connected to the audio connection port 130, the frequency adjuster 160 is not signally connected to the wireless communicator 140. When the frequency adjuster 160 is signally connected to the wireless communicator 140, the frequency adjuster 160 is not signally connected to the audio connection port 130. The switch 150 is configured to determine whether the frequency adjuster 160 is connected to the audio connection port 130 or the wireless communicator 140. The switch 150 may be a manual switch, such as a mechanical switch, a touch switch, or other forms of switches.

The shell 112 also houses the audio connection port 130 and the switch 150. However, the left ear speaker 110, the right ear speaker 120, the audio connection port 130, the wireless communicator 140, the switch 150, and the frequency adjuster 160 can also be connected via a wire without configuring the shell 112.

In the embodiment, the earphone with binaural beats function 100 may further include an audio cable 170. The audio connection port 130 of the embodiment is an audio socket. Two ends of the audio cable 170 are respectively inserted into the audio connection port 130 and an audio output socket of an analog audio output device, such as an audio output socket 60 of an airplane. That is to say, when the user is on an airplane, although the user cannot use wireless methods such as Bluetooth communication to connect to the mobile phone, the user can still receive external audio signal output from the audio output socket 60 of the airplane in a wired manner via the audio cable 170. Moreover, the frequency adjuster 160 can adjust the external audio signal received from the audio output socket 60 of the airplane to allow the user's left ear and right ear to hear sound waves with frequency differences, so that the user's brain may stimulate the production of specific brain waves to achieve effects such as improving concentration, sleeping comfortably, relieving stress, and entering meditation. In addition, the audio cable 170 may also be connected to an audio output hole of an analog audio output device such as a television, a radio, a Walkman, a notebook computer, a cruise ship seat, and the like.

In the embodiment, the frequency adjuster 160 includes, for example, an analog-to-digital conversion circuit 162, a frequency adjustment circuit 164, and a digital-to-analog conversion circuit 166 that are signally connected in sequence. Usually, the external audio signal received by the frequency adjuster 160 is an analog signal. After the analog-to-digital conversion circuit 162 converts the external audio signal into a digital signal, the frequency adjustment circuit 164 can adjust it into a first audio signal and the second audio signal. Then, the digital-to-analog conversion circuit 166 converts the first audio signal and the second audio signal from digital signals into analog signals to drive the left ear speaker 110 and the right ear speaker 120.

The earphone with binaural beats function 100 of the embodiment may also include a printed circuit board assembly 180 and a battery 190. The printed circuit board assembly 180 and the battery 190 are, for example, disposed in the shell 112, and the printed circuit board assembly 180 and the battery 190 are located on the left and right sides of the shell 112, respectively. The audio connection port 130, the wireless communicator 140, the switch 150, and the frequency adjuster 160 are, for example, all disposed on the printed circuit board assembly 180. The battery 190 is electrically connected to the printed circuit board assembly 180, the left ear speaker 110 and the right ear speaker 120 and provides power to them. The left ear speaker 110 and the right ear speaker 120 may be moving coil type speakers, moving iron type speakers, bone conduction type speakers, or other forms of speakers.

The earphone with binaural beats function 100 of the embodiment may also include a wireless receiver 185 configured to receive FM broadcasts or Bluetooth broadcasts and signally connected to the left ear speaker 110 and the right ear speaker 120 via a wire. The wireless receiver 185 can also be disposed on the printed circuit board assembly 180. The wireless receiver 185 and the wireless communicator 140 perform their respective functions independently. After receiving the FM broadcast or Bluetooth broadcast, the wireless receiver 185 can transmit the audio signal to the left ear speaker 110 and the right ear speaker 120. That is, the earphone with binaural beats function 100 of the embodiment can listen to FM broadcasts, Bluetooth broadcasts, or other wireless broadcasts.

Figure 3:
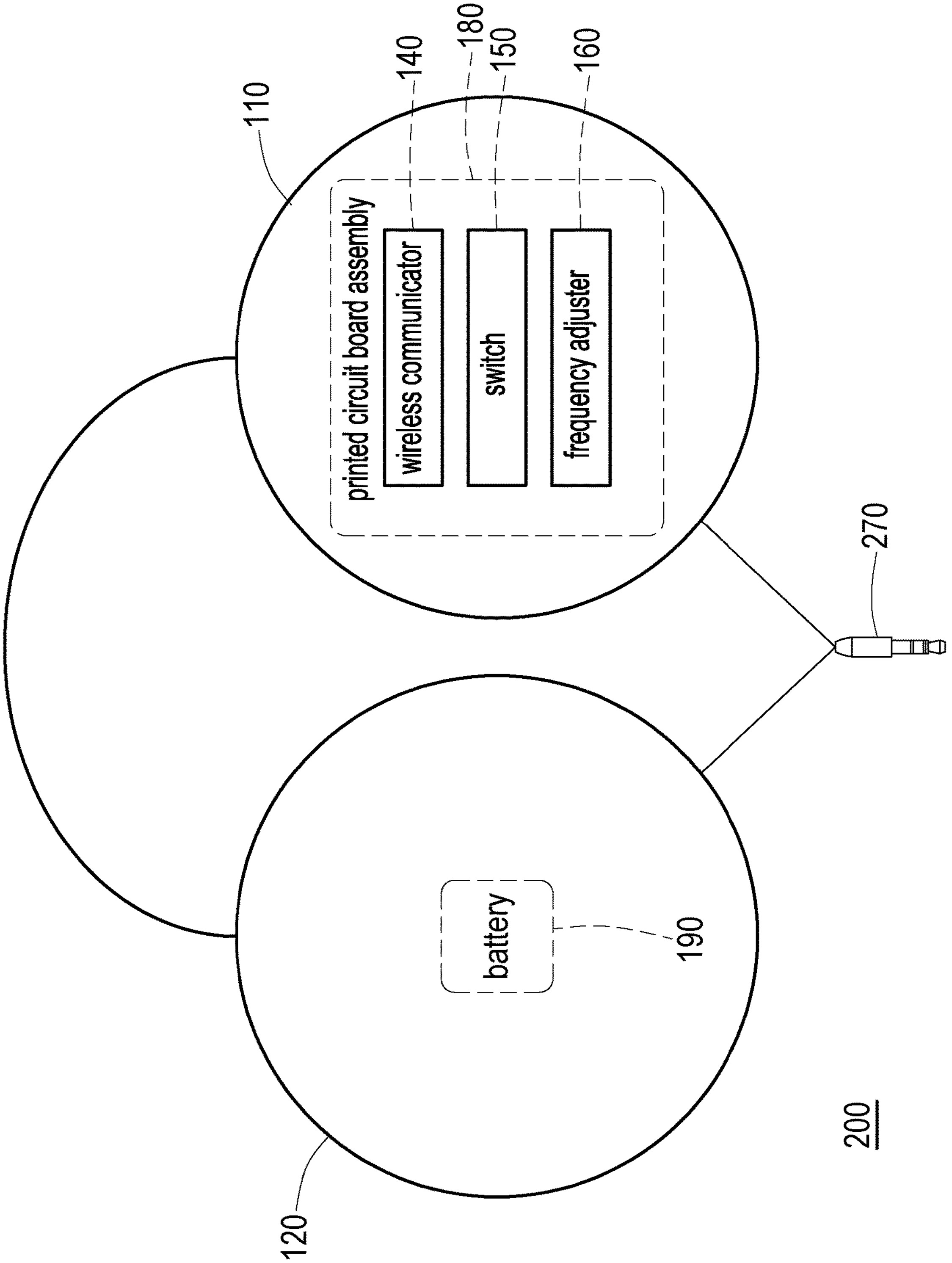
FIG. 3 is a schematic diagram of an earphone with binaural beats function according to another embodiment of the disclosure.

FIG. 3 is a schematic diagram of an earphone with binaural beats function according to another embodiment of the disclosure. Referring to FIG. 3, an earphone with binaural beats function 200 of the embodiment is similar to the earphone with binaural beats function 100 of FIG. 1, and only the differences between the two will be described here. An audio connection port 270 of the earphone with binaural beats function 200 of the embodiment is an audio plug, and both the left ear speaker 110 and the right ear speaker 120 are signally connected to the audio connection port 270 via a wire. Therefore, the audio connection port 270 can be plugged into the audio output socket of the airplane to receive external audio signal output from the audio output socket of the airplane in a wired manner.

For example, the printed circuit board assembly 180 of the earphone with binaural beats function 200 of the embodiment, for example, shares a shell with the left ear speaker 110, and the battery 190, for example, shares a shell with the right ear speaker 120, or the positions of the two can be reversed.

Figure 4:
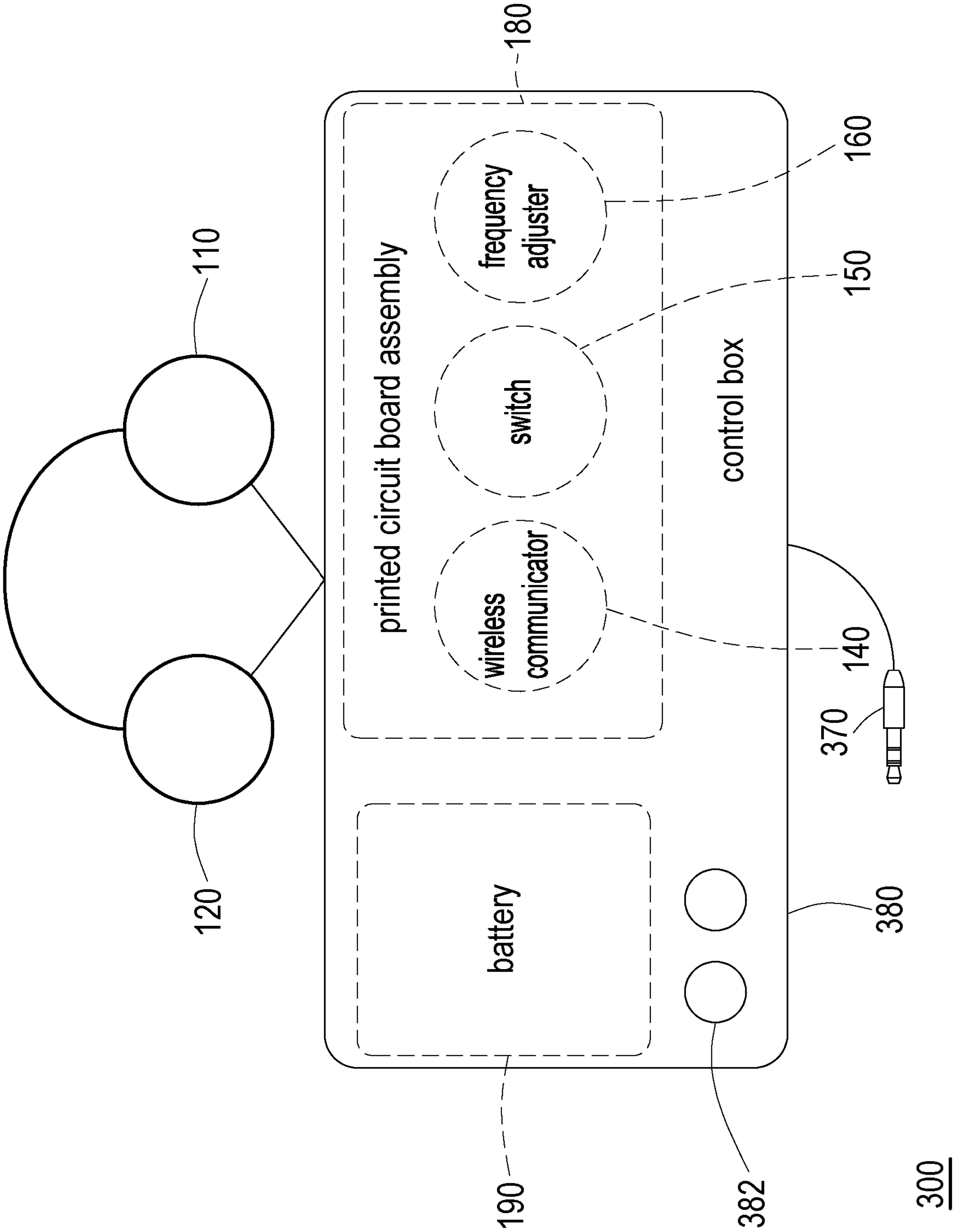
FIG. 4 is a schematic diagram of an earphone with binaural beats function according to still another embodiment of the disclosure.

FIG. 4 is a schematic diagram of an earphone with binaural beats function according to still another embodiment of the disclosure. Referring to FIG. 4, an earphone with binaural beats function 300 of the embodiment is similar to the earphone with binaural beats function 100 of FIG. 1, and only the differences between the two will be described here. An audio connection port 370 of the earphone with binaural beats function 300 of the embodiment is an audio plug, and both the left ear speaker 110 and the right ear speaker 120 are signally connected to the audio connection port 370 via a wire. Therefore, the audio connection port 370 can be wiredly connected to the audio output socket of the airplane to receive external audio signal output from the audio output socket of the airplane.

The earphone with binaural beats function 300 of the embodiment may further include a control box 380. The printed circuit board assembly 180 and the battery 190 are disposed in the control box 380. Similar to the embodiment of FIG. 1, the audio connection port 130, the wireless communicator 140, the switch 150, and the frequency adjuster 160 are, for example, all disposed on the printed circuit board assembly 180. A plurality of buttons 382 can also be disposed on the control box 380 as an operation interface for controlling the switch 150, volume adjustment, playback control, and other functions.

In summary, the earphone with binaural beats function of the disclosure can receive external audio signal in a wired or wireless manner, and can also be used on airplane where wireless communication is prohibited, and has a wide range of applicable scenarios. In addition, the frequency adjuster 160 causes the sound waves received by the user's two ears to have a frequency difference, which allows the user to produce corresponding effects in addition to hearing the sound waves, such as improving concentration, sleeping comfortably, relieving stress, and entering meditation.

What is claimed is:

1. An earphone with binaural beats function, comprising:

a left ear speaker, configured to provide a first sound wave to a left ear of a user;

a right ear speaker, configured to provide a second sound wave to a right ear of the user;

a wireless communicator; and a frequency adjuster, signally connected to the left ear speaker and the right ear speaker via a wire, and signally connected to the wireless communicator, wherein the frequency adjuster receives an external audio signal from the wireless communicator, the frequency adjuster adjusts the external audio signal to a first audio signal and then transmits the first audio signal to the left ear speaker, so that the left ear speaker emits the first sound wave, the frequency adjuster adjusts the external audio signal to a second audio signal and transmits the second audio signal to the right ear speaker, so that the right ear speaker emits the second sound wave, and a first frequency of the first sound wave and a second frequency of the second sound wave have a frequency difference, wherein the frequency difference comprises a plurality of switchable first frequency differences, and the first frequency differences automatically change cyclically in two or more ranges, the ranges chosen from the group of between 0.5 Hz and 4 Hz, between 4 Hz and 8 Hz, between 8 Hz and 12 Hz, between 12 Hz and 20 Hz, and between 25 Hz and 40 Hz.

2. The earphone with binaural beats function according to claim 1, further comprising an audio connection port and a switch, wherein the frequency adjuster is selectively signally connected to either the audio connection port or the wireless communicator via the switch, and receives the selected one of external audio signal from the audio connection port or the wireless communicator.

3. The earphone with binaural beats function according to claim 2, further comprising an audio cable, wherein two ends of the audio cable are respectively inserted into the audio connection port and an audio output socket of an analog audio output device.

4. The earphone with binaural beats function according to claim 2, further comprising a control box, wherein the audio connection port, the wireless communicator, the switch, and the frequency adjuster are disposed in the control box.

5. The earphone with binaural beats function according to claim 2, wherein the switch is a manual switch.

6. The earphone with binaural beats function according to claim 1, further comprising a wireless receiver configured to receive FM broadcasts or Bluetooth broadcasts, and signally connected to the left ear speaker and the right ear speaker via the wire.

7. The earphone with binaural beats function according to claim 1, wherein the wireless communicator performs wireless communication with a mobile phone, and the mobile phone transmits the external audio signal.

8. The earphone with binaural beats function according to claim 1, wherein the wireless communicator performs Bluetooth communication.

9. The earphone with binaural beats function according to claim 1, wherein the frequency adjuster comprises an analog-to-digital conversion circuit, a frequency adjustment circuit, and a digital-to-analog conversion circuit that are signally connected in sequence.

10. The earphone with binaural beats function according to claim 1, wherein the left ear speaker and the right ear speaker are moving coil type speakers, moving iron type speakers, or bone conduction type speakers.

* * * * *